(12) United States Patent
Antika et al.

(10) Patent No.: US 6,703,355 B2
(45) Date of Patent: Mar. 9, 2004

(54) METHOD FOR LUBRICATING HIGH PRESSURE HYDRAULIC SYSTEM USING PHOSPHATE ESTER HYDRAULIC FLUID

(75) Inventors: Shlomo Antika, Maplewood, NJ (US); Marc-Andre Poirier, Cherry Hill, NJ (US); Jean-Michel Pascual, Venerque (FR); Gerard Dallemagne, Villepreux (FR)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/922,088

(22) Filed: Aug. 3, 2001

(65) Prior Publication Data

US 2003/0060377 A1 Mar. 27, 2003

Related U.S. Application Data

(60) Provisional application No. 60/223,221, filed on Aug. 4, 2000.

(51) Int. Cl.[7] .......................................... C10M 105/74
(52) U.S. Cl. ...................................... 508/433; 252/78.5
(58) Field of Search ..................... 252/78.5; 508/433

(56) References Cited

U.S. PATENT DOCUMENTS

| | | | |
|---|---|---|---|
| 3,487,020 A | 12/1969 | Peeler et al. .............. 252/78 |
| 3,592,772 A | 7/1971 | Godfrey et al. ............. 252/78 |
| 3,679,587 A | 7/1972 | Smith .................... 252/75 |
| 3,718,596 A | 2/1973 | Richard, Jr. .............. 252/78 |
| 3,723,320 A | 3/1973 | Herber et al. ............. 252/78 |
| 3,849,324 A | 11/1974 | Sheratte ................ 252/78 |
| 3,907,697 A | 9/1975 | Burrous .................. 252/75 |
| 3,931,022 A | 1/1976 | Chesluk et al. ........... 252/47.5 |
| 3,941,708 A | 3/1976 | Gentit et al. .............. 252/78 |
| 3,983,046 A | 9/1976 | Sheratte ............... 252/78.5 |
| 4,181,619 A | 1/1980 | Schmitt et al. ........... 252/32.5 |
| 4,206,067 A | 6/1980 | MacKinnon ............... 252/75 |
| 4,302,346 A | 11/1981 | MacKinnon ............... 252/75 |
| 5,035,824 A | 7/1991 | MacKinnon ............... 252/75 |
| 5,205,951 A | 4/1993 | MacKinnon .............. 252/78.5 |
| 5,464,551 A | 11/1995 | Deetman ............... 252/78.5 |
| 5,817,606 A | 10/1998 | Kinker et al. ............. 508/440 |
| 6,030,543 A * | 2/2000 | Placek et al. ............ 252/78.5 |
| RE37,101 E * | 3/2001 | Deetman ............... 252/78.5 |
| 6,254,799 B1 * | 7/2001 | Antika et al. ............ 252/78.5 |
| 6,319,423 B1 * | 11/2001 | Okazaki et al. .......... 252/78.5 |
| 6,391,225 B1 * | 5/2002 | Poirier .................. 252/78.5 |

FOREIGN PATENT DOCUMENTS

| | | | |
|---|---|---|---|
| GB | 1121567 | 7/1968 | .......... C10M/1/46 |
| WO | WO96/17517 | 6/1996 | .......... A01N/27/00 |

OTHER PUBLICATIONS

Solutia Inc., Material Safety Data Sheet for SKYDROL LD4, Aug. 23, 2001, p. 1–8.*

* cited by examiner

Primary Examiner—Ellen M. McAvoy
(74) Attorney, Agent, or Firm—Charles J. Brumlik

(57) ABSTRACT

The present invention is a method for operating a hydraulic system at pressures of about 4000 psi or higher, preferably about 5000 psi or higher by using as the lubricant a phosphate ester hydraulic oil comprising a fire resistant phosphate esters base stock, a viscosity index improver, an anti erosion agent, an acid scavenger. The fluid used in the present method can also contain rust inhibitors and/or antioxidants.

20 Claims, 4 Drawing Sheets

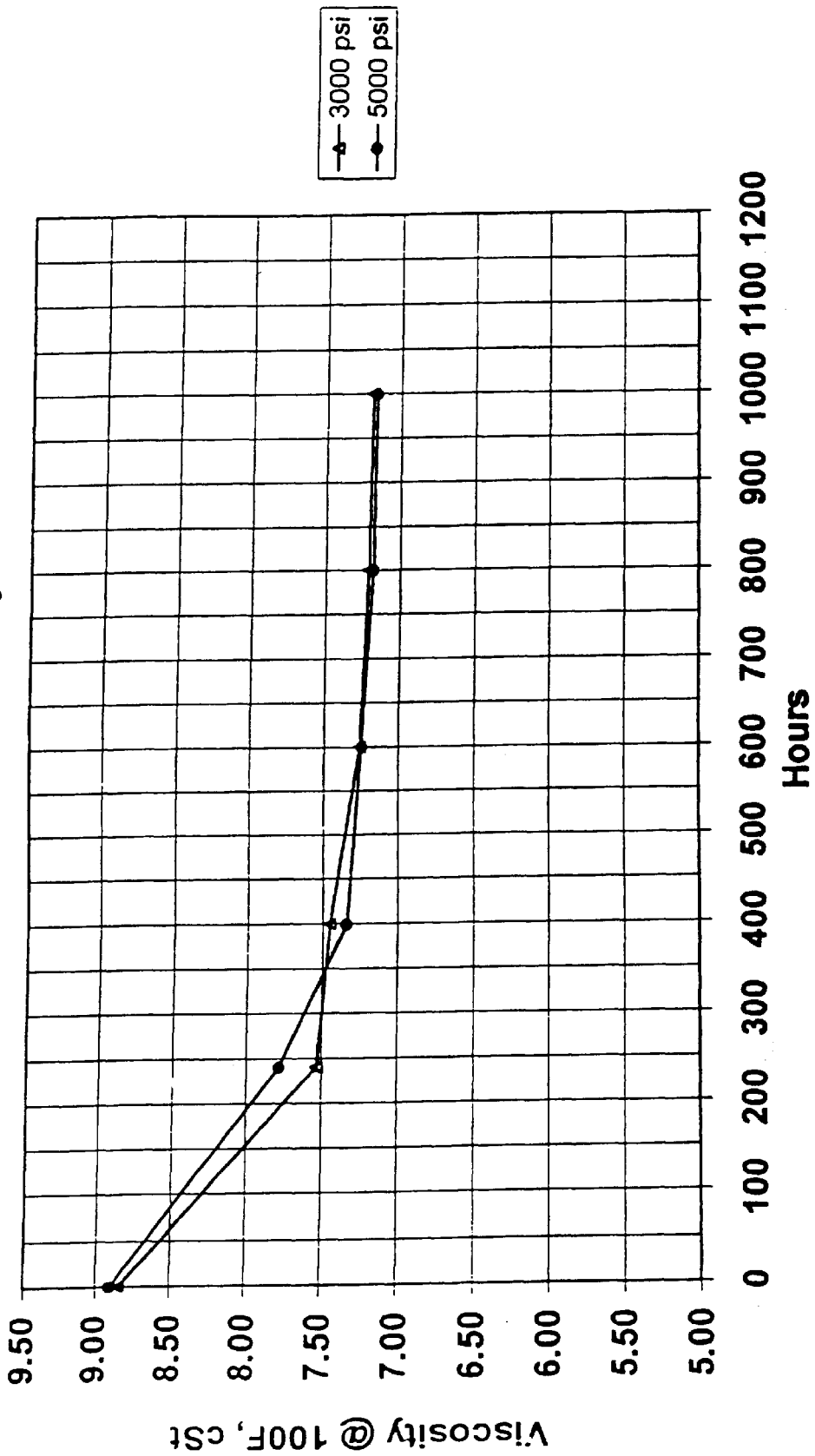

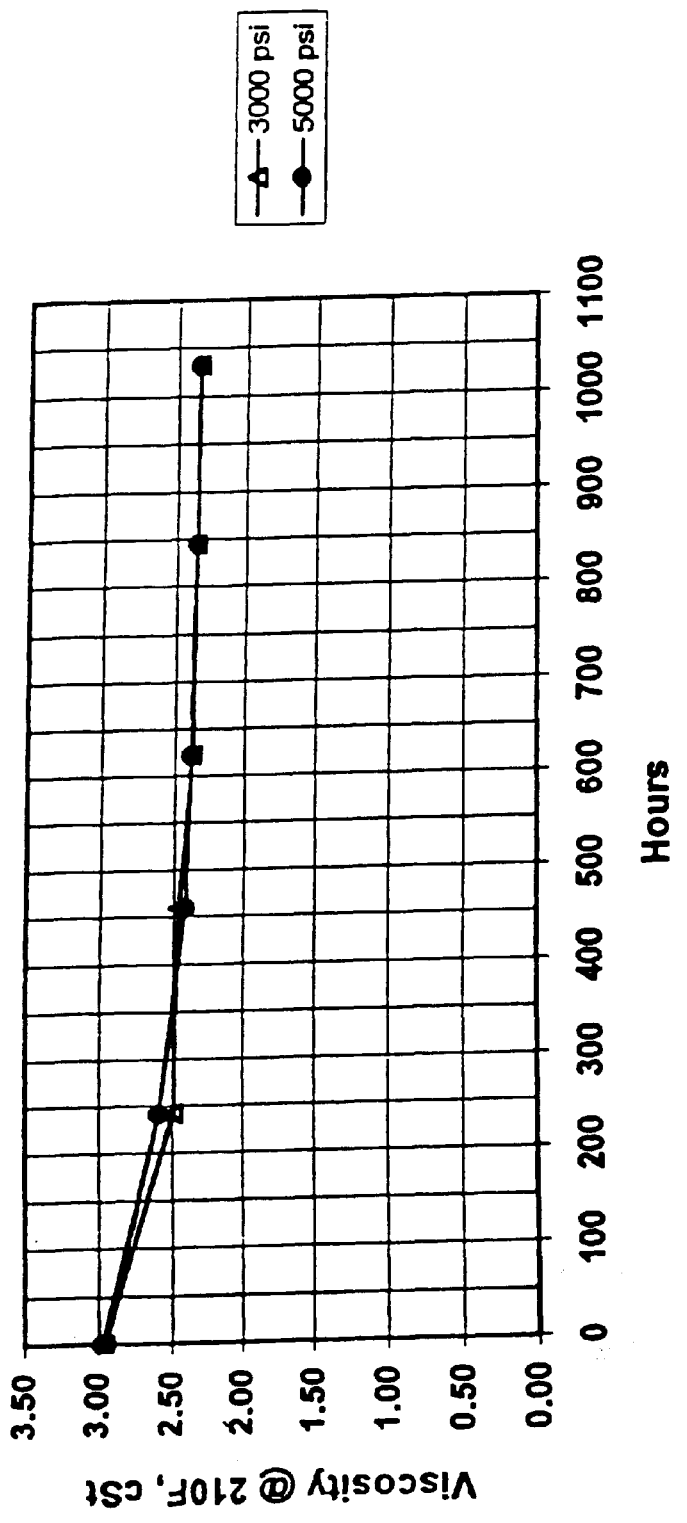

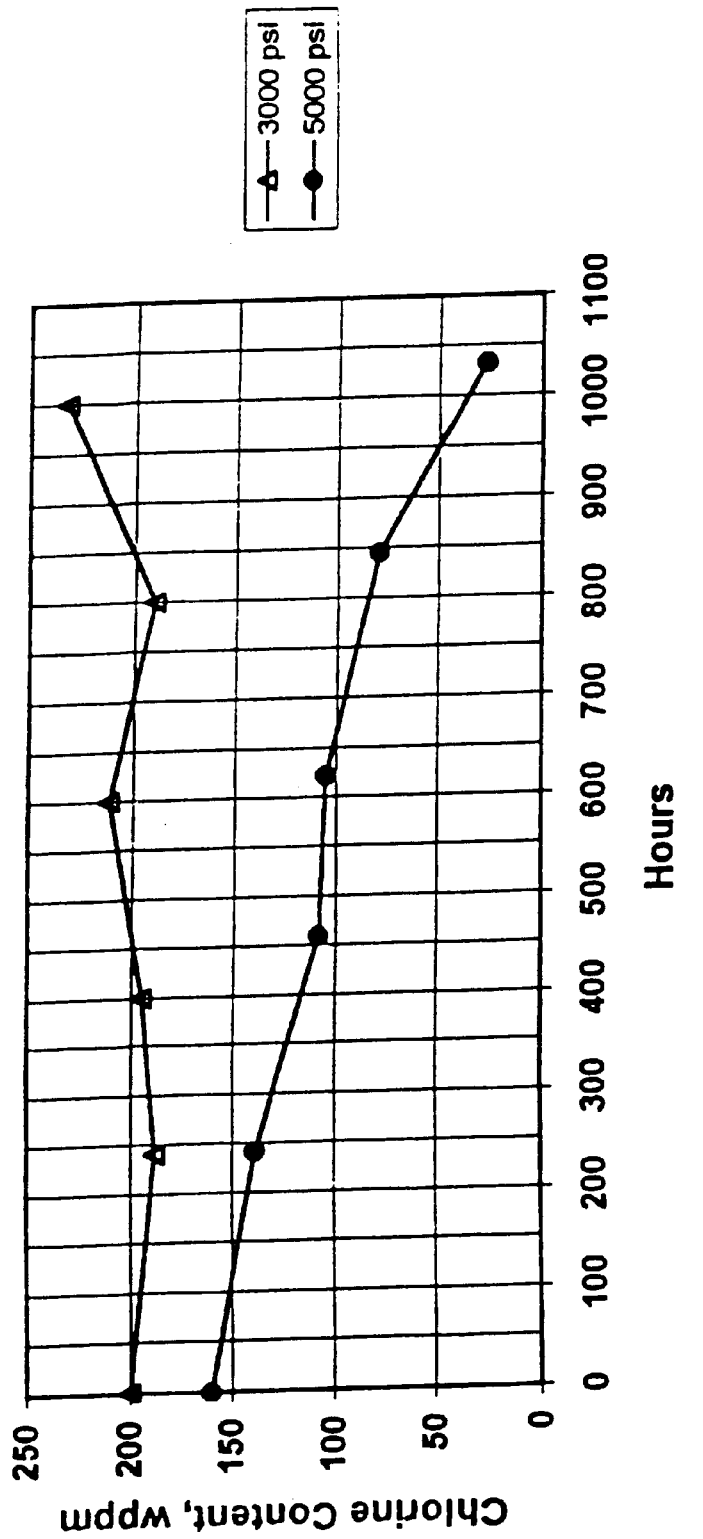

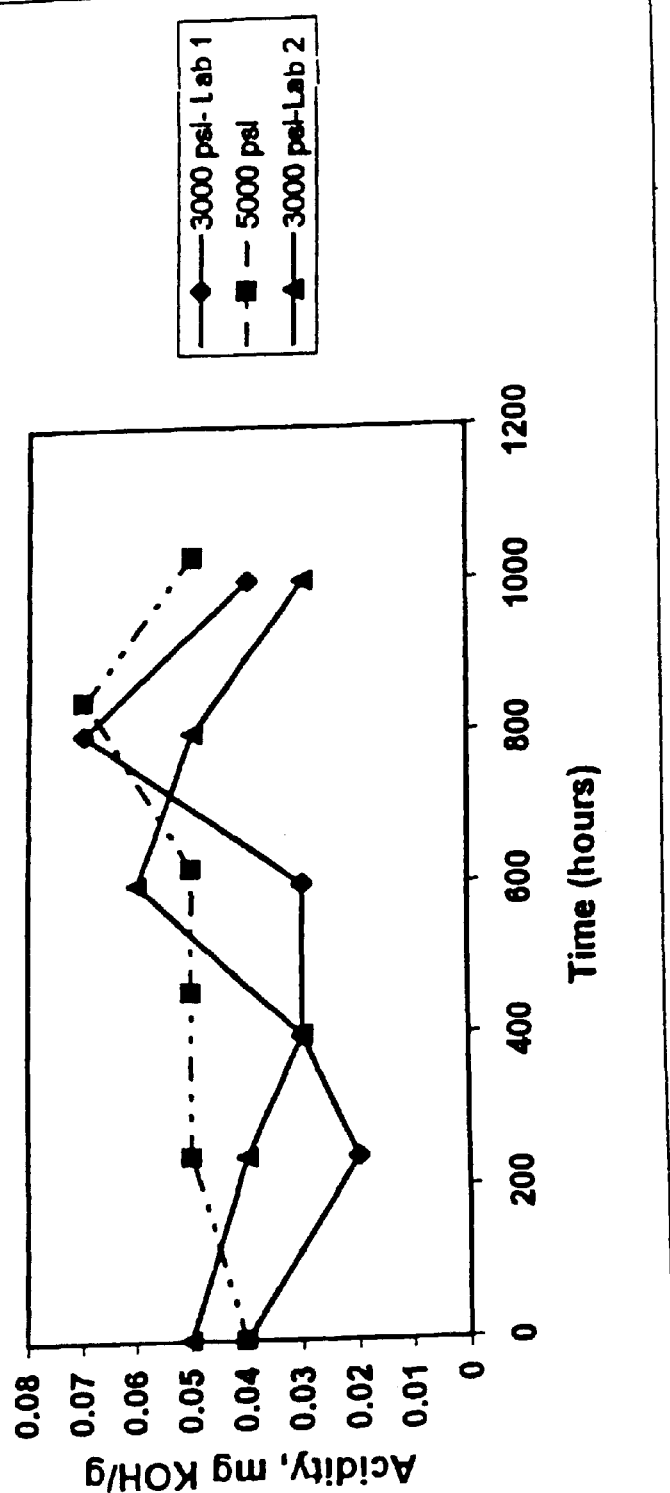
Figure 4. Fluid Qualification Test Rig: Total Acid Number in mg KOH/g

METHOD FOR LUBRICATING HIGH PRESSURE HYDRAULIC SYSTEM USING PHOSPHATE ESTER HYDRAULIC FLUID

This application claims the benefit of U.S. Provisional application No. 60/223,221 filed Aug. 4, 2000.

BACKGROUND OF THE INVENTION

1. Field of the Invention

The present invention relates to the lubrication of high pressure hydraulic systems, particularly those employed in aircraft by using, as the hydraulic fluid, phosphate ester based fluids.

2. Description of the Related Art

Phosphate ester based hydraulic fluids are well known in the lubrication art and have been utilized for years in hydraulic systems operating at pressures of about 3000 psi and lower.

Phosphate ester based functional fluids useful as aircraft hydraulic fluids have been described in U.S. Pat. Nos. 5,464,551, 3,723,320, 3,679,587.

Aircraft flight control equipment are operated by hydraulic systems. Commercial transport aircraft typically utilize phosphate ester hydraulic fluids while military aircraft utilize mineral oil or polyalphaolefin hydraulic fluids. The standard operating pressure for aircraft hydraulic systems is nominally 3000 psi.

There are a number of examples of aircraft hydraulic systems operating above 3000 psi. Some US military aircraft such as the V-22 Tilt Rotor aircraft have hydraulic systems that operate at 5000 psi. The F/A-18E/F Super Hornet Strike Fighter switches between 3000 psi to 5000 psi operation, depending on aircraft speed, but as previously stated such military aircraft do not use phosphate ester based hydraulic fluids. The Concorde supersonic civil transport aircraft hydraulic system operates at 4000 psi. The Concorde is unusual in that it utilizes a silicate ester hydraulic fluid rather than a phosphate ester hydraulic fluid. There are currently no commercial aircraft using phosphate ester hydraulic fluid which operate above 3000 psi (nominal) hydraulic system pressure.

The commercial aircraft system designers have opted to use phosphate esters because of the superior fire resistance properties of phosphate esters. However, the reduced fire risk is accompanied by a debit in various performance parameters such as lesser stability when compared to the hydrocarbon based fluids used in military aircraft and presence of an unusual corrosion phenomenon. Phosphate esters tend to absorb atmospheric moisture readily and build up high concentrations of water (0.3 to 1.0% water, sometimes more). Like all esters, these fluids have the potential to hydrolyze (react with water to form alcohols and acids). The presence of high concentrations of water typically results in the extent of hydrolysis setting the life of the fluid (point at which the fluid has to be replaced). The corrosion phenomenon peculiar to phosphate esters is termed electro-chemical erosion and it occurs at locations of high fluid velocity and pressure drop. Damage to hydraulic system parts due to electro-chemical erosion will increase rapidly with increases in operating temperature (as would be the case for any corrosion reaction) and with increases in the differential pressure to which a hydraulic pressure device is exposed. The differential pressure mentioned is the pressure difference between hydraulic system main pressure and hydraulic system reservoir pressure (around 50 to 100 psi) to which a hydraulic pressure device is exposed.

Higher hydraulic system operating design pressure would allow a reduction in the size of the hydraulic system components and in the hydraulic fluid inventory of an aircraft hydraulic system. This translates into lower aircraft weight, which is very desirable. A major obstacle to hydraulic system designs of higher than 3000 psi systems for commercial aircraft has been the property limitations of phosphate ester hydraulic fluids. When the Concorde was designed during the late 1960's, phosphate ester hydraulic fluids were found to be unsuitable and a silicate ester hydraulic fluid was selected for this aircraft. Even though major improvements in the performance of phosphate esters have been achieved since the Concorde experience through the use of potent additives, significant questions remain regarding the ability of phosphate ester aviation hydraulic fluid in operating successfully in a higher than 3000 pressure system, without rapid and significant degradation of the fluid and without damage to hydraulic system components.

DESCRIPTION OF THE FIGURES

FIG. 1 compares the fluid kinematic viscosity at 100° F. (measured by test method ASTM D445) over about 1000 hours during 3000 psi and 5000 psi test runs.

FIG. 2 compares the fluid kinematic viscosity at 210° F. (measured by test method ASTM D445) over about 1000 hours during 3000 psi and 5000 psi test runs.

FIG. 3 compares the fluid chlorine content (by Dohrman Analysis or x-ray fluorescence, both methods being acceptable equivalent methods) over about 1000 hours during 3000 psi and 5000 psi test runs.

FIG. 4 compares the total acid number (TAN), also known as Acidity Index, (measured by test method ASTM D974) of the fluid over about 1000 hours of test employing one sample of the fluid at 5000 psi and two samples (independently) in two separate 3000 psi test runs.

DESCRIPTION OF THE INVENTION

It has been discovered that hydraulic systems operating at elevated operating pressures of about 4000 psi or higher, preferably about 5000 psi or higher can be successfully operated and lubricated by use of phosphate ester functional fluid comprising a major amount a fire resistant phosphate ester base stock, and a minor effective amount of additive comprising one or more an anti erosion agent(s), one or more an acid scavenger(s) and one or more viscosity index (VI) improver(s). The useful hydraulic fluid can also contain one or more rust inhibitors and/or one or more antioxidants.

DETAILED DESCRIPTION OF THE INVENTION

Phosphate ester functional fluid which has been found to successfully lubricate hydraulic systems operating at pressures of about 4000 psi or higher, preferably 5000 psi or higher are based on phosphate ester base fluids which are well known in the art.

Phosphate ester base fluids are generally of the formula:

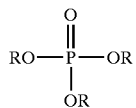

wherein each R is the same or different and selected from alkyl or alkoxy alkyl group having 2 to 20 carbon atoms, aryl groups (e.g., phenyl) and substituted aryl groups containing up to 20 carbon atoms where the substituents are alkyl, phenyl, alkyl phenyl or phenyl alkyl and wherein the alkyl group contain form 1 to 10 carbons. Typical examples of such phosphates are dibutyl phenyl phosphate, butyl diphenylphosphate, diisobutyl phenyl phosphate, isobutyl diphenyl phosphate, triphenyl phosphate, alkylated tri phenyl phosphates such as tri(isopropyl phenyl) phosphate and tri(tertbutyl phenyl) phosphate, tri cresyl phosphate, tri butyl phosphate, tri-2-ethyl hexyl phosphate, tri octyl phosphate, etc., and mixtures of phosphates.

More recently, particular mixtures of phosphate esters have been identified as being useful as the base fluid for phosphate ester based functional fluids, especially those used in aircraft. Thus references can be made to Skydrol® LD-4 which reportedly contains 30–35 wt % di butyl phenyl phosphate 50 to 60 wt % tributyl phosphate, 5 to 10 wt % viscosity index improver, 0.13 to 1 wt % diphenyldithioethane copper corrosion inhibitor, 0.005 to 1 wt % perfluoroalkylsulfonic acid salt anti erosion agent, 4 to 8 wt % acid scavenger and about 1 wt % 2,6 di tertiary butyl p-cresol as an antioxidant.

As aircraft hydraulic systems have advanced and operating conditions have become more severe, special phosphate ester base stocks have been described. U.S. Pat. No. 5,464,551 describes a base stock comprising between about 10 to 100 wt % of a trialkyl phosphate, between about 0 and 70 wt % dialkyl aryl phosphate and from about 0 to 25 wt % alkyl diaryl phosphate, the sum of the proportionate amount of each component equally 100%. Specifically, it is stated that the alkyl substitutent of the trialkyl phosphate contains between 3 and 8 carbons, preferably between 4 and 8 carbons, more preferably between 4 and 5 carbons and are bonded to the phosphate moiety via a primary carbon. Preferably the alkyl substitutents of the tri alkyl phosphate, the di alkyl aryl phosphate and the alkyl di aryl phosphate are isoalkyl groups, substantially iso $C_4$ and iso $C_5$ alkyl groups.

Another more recent advance in base fluid is described in WO 96/17517, published Jun. 13, 1996, which teaches a phosphate ester base stock comprising 60 to 95 wt % of a tri alkyl phosphate and about 5 to 40 wt % of a second component selected from the group consisting of triaryl phosphate, a mixture of triaryl phosphate and linear polyoxy alkylene material, and a linear polyoxyl alkylene material, which base stock is free of di alkyl aryl phosphate and alkyl di aryl phosphate. In such base fluid the alkyl groups are, aliphatic and alicyclic group wherein the aliphates group are straight or branched chain, and contain independently, 1 to 12 carbon atoms and di aryl groups are, independently, phenyl or alkyl substituted phenyl having from 7 to 20 carbon atoms.

Examples of tri alkyl phosphate esters include, by way of example, tri-n-butyl phosphate, tri-iso-butyl phosphate, tri-sec-butyl phosphate, di-iso butyl pentyl phosphate, tri-n-pentyl phosphate, tri-2-ethyl hexyl phosphate, and the like. Mixtures of trialkyl phosphates can be used. Preferred trialkyl phosphates are the tri-butyl phosphates, the mixture of tri isobutyl phosphate and tri n-butyl phosphate being most preferred.

The alkyl substituted phenyl groups of the triaryl phosphates include phenyl groups having from 1 to 3 alkyl substituents wherein the alkyl groups are straight a branched chain groups of form 1 to 14 carbon atoms and further, wherein each alkyl substituted phenyl group has a maximum of up to 20 carbons. Examples of triaryl phosphate esters include, by way of example tri(isopropyl phenyl) phosphate, tri (tert-butylated phenyl) phosphate, tri cresyl phosphate, and the like and mixtures thereof.

Combinations of tri alkyl phosphates and tri aryl phosphates include a mixture of tributyl phosphate and tri (isopropylphenyl) phosphate at about a 6:1 to 7:1 ratio, and a mixture of tri butyl phosphate and tri (butylated phenyl) phosphate at about a 6:1 to 7:1 ratio.

The linear poly oxy alkylene material is of the formula:

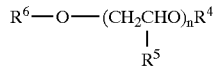

wherein $R^4$ and $R^6$ are independently selected from the group consisting of hydrogen and $C_1$–$C_{30}$ hydrocarbyl groups and $R^5$ is selected from the group consisting of hydrogen and $CH_3$, and n is an integer such that the number average molecular weight of the polymer is about 300 to 1000.

The linear polyoxyl alkylene materials are either commercially available or readily prepared by methods known in the art, see U.S. Pat. No. 4,933,485, incorporated herein by reference.

In a most preferred embodiment the phosphate ester base stock is a mixture of tri isobutyl phosphate and tri butyl phosphate and a sufficient amount of one or more triaryl phosphates to give a fluids which produces no more than 25% elastomer seal swell, this amount, preferably being 4 to 15 wt % of one or more triaryl phosphates.

The amount of tri iso butyl phosphate used ranges from about 30 to about 80 wt %, preferably about 30 to 40 wt % based on total fluid, the amount of tri-n-butyl phosphate used ranges from about 20 to about 60 wt %, preferably about 35 to about 45 wt % based on total fluid and the amount of one or more tri aryl phosphates used ranges from about 4 to 15 wt %, preferably about 10 to 15 wt % based on the total fluid.

It has been discovered that hydraulic systems operating at pressures of about 4000 psi and higher preferably about 5000 psi and higher can be effectively lubricated used a phosphate ester based fluid comprising a fire resistant phosphate ester base oil and a viscosity index improver, an acid scavenger and an erosion inhibitor. The fluid may also contain one or more rust inhibitors, one or more antioxidants, one or more metal corrosion inhibitor.

A viscosity index (VI) improver is employed in the hydraulic fluid compositions used in the method of this invention in an amount effective to reduce the effect of temperature on the viscosity of the aircraft hydraulic fluid. Examples of suitable VI improvers are disclosed, for example, in U.S. Pat. Nos. 5,464,551 and 3,718,596, the entire disclosures of which are incorporated herein by reference in their entirety. Preferred VI improvers include poly (alkyl acrylate) and poly (alkyl methacrylate) esters of the type disclosed in U.S. Pat. No. 3,718,596 and which are commercially available from Rohm & Haas, Philadelphia, Pennsylvania (e.g., available under the tradenames HF-411, HF-460, PA-7570, and the like). Such esters typically have a weight average molecular weight range of from about 50,000 to about 1,500,000 and preferably from about 50,000 to 250,000. Preferred VI improvers include those having a molecular weight peak at about 70,000 to 100,000 (e.g., about 85,000 or 90,000 to 100,000). Mixtures of VI improvers can also be used.

The VI improver is present in an amount effective to reduce the effect of temperature on viscosity, preferably from about 2 to about 10 wt % (on an active ingredient) and more preferably from about 4 to about 6 wt % based on the total weight of the hydraulic fluid composition. The VI improver can be mixed with a portion of the phosphate ester base stock, typically as a 1:1 mixture and then added to the balance of the hydraulic fluid.

The aircraft hydraulic fluid compositions used in the method of this invention further comprise an acid control additive, acid receptor, or acid scavenger (all three terms used as synonyms in the patent and public literature) in an amount sufficient to neutralize acids formed in aircraft hydraulic fluid, such as phosphoric acid and its partial esters. Suitable acid control additives are described, for example, in U.S. Pat. Nos. 5,464,551, 3,723,320 and 4,206,067, the disclosures of which are incorporated herein in their entirely.

Preferred acid control additives have the formula:

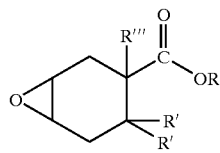

where R is selected from the group consisting of an alkyl group of from 1 to 10 carbon atoms optionally containing from 1 to 4 ether oxygen atoms therein and cycloalkyl of from 3 to 10 carbon atoms, each R' is independently selected from the group consisting of hydrogen, alkyl of from 1 to 10 carbon atoms and —C(O)OR" where R" is alkyl of from 1 to 10 carbon atoms optionally containing from 1 to 4 ether oxygen atoms therein or cycloalkyl of from 3 to 10 carbon atoms, R''' is selected from the group consisting of hydrogen, alkyl of from 1 to 10 carbons atoms and —C(O)OR" where R" is alkyl of from 1 to 10 carbon atoms optionally containing from 1 to 4 ether oxygen atoms therein or cycloalkyl of from 3 to 10 carbon atoms.

Preferred acid scavengers of the above formula are the monoepoxide 7-oxabicyclo[4.1.0]heptane-3-carboxylic acid, 2-ethylhexyl ester which is disclosed in U.S. Pat. No. 3,723,320, and the monoepoxide 7-oxa-bicyclo[4.1.0]-heptane-3,4-dicarboxylic acid, dialkyl esters (e.g., the di-isobutyl ester). Dialkyl esters of this monoepoxide are also disclosed in U.S. Pat. No. 3,723,320. The trialkyl and tetraalkyl esters are prepared via conventional Diels-Alder reaction procedures via a suitable unsaturated trialkyl or tetraalkyl ester and a suitable 1,3-diene. The Diels-Alder reaction provides for 4+2 cyclo addition to provide for a cyclohexene derivative having the suitable trialkyl or tetraalkyl esters. The unsaturation in the cyclohexane is utilized to provide for epoxide formation via conventional methods.

Suitable unsaturated trialkyl and tetraalkyl esters are known in the art. For example, tetraethyl ethylene tetracarboxylate is available from Fluka (Ronkonoma, N.Y.). This alkyl groups of this tetraethyl ester can readily be exchanged via conventional techniques to provide for other esters as defined above.

The use of such di-, tri- and tetraalkyl esters of this monoepoxide provide for enhanced seal compatibility for the formulation of this invention as well as with conventional formulations employing conventional trihydrocarbyl phosphate basestocks with the ethylene propylene seals used in aircraft hydraulic systems.

The swelling of ethylene propylene seals in an aircraft hydraulic system due to contact of said seals with an aircraft hydraulic fluid composition containing 7-oxabicyclo-[4.1.0] heptane-3-carboxylic acid, 2-ethylhexyl ester as the acid scavenger is further reduced by:

(a) replacing at least a portion of the 7-oxabicyclo-[4.1.0] heptane-3-carboxylic acid, 2-ethylhexyl ester acid scavenger with an acid scavenger of the formula:

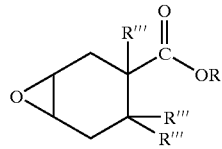

where R is selected from the group consisting of an alkyl group of from 1 to 10 carbon atoms optionally containing from 1 to 4 ether oxygen atoms therein and cycloalkyl of from 3 to 10 carbon atoms, each R''' is independently selected from the group consisting of hydrogen, alkyl of from 1 to 10 carbons atoms and —C(O)OR where R is as defined above, with the proviso that at least one of R" is —C(O)OR.

Preferably, at least 20%, and more preferably from about 20% to about 100% of the 7-oxabicyclo-[4.1.0]heptane-3-carboxylic acid, 2-ethylhexyl ester acid scavenger is replaced by the di ester acid scavenger.

The acid control additive whether as mono- di-, tri- or tetra-ester is employed in an amount effective to scavenge the acid generated, typically as partial esters of phosphoric acid, during operation of the power transmission mechanisms of an aircraft. Preferably, the acid control additive is employed in an amount ranging from about 4 to about 10 wt %, based on the total weight of the hydraulic fluid composition, and more preferably from 5 to 9 wt % and still more preferably from 6 to 8 wt %.

The hydraulic fluid compositions used in the method of this invention also typically comprise an erosion inhibitor in an amount effective to inhibit flow-induced electrochemical corrosion. Suitable erosion inhibitors are disclosed, for example, in U.S. Pat. Nos. 5,464,551 and 3,679,587, the entire disclosures of which are incorporated herein by reference in their entirety. Preferred erosion inhibitors include the alkali metal salts, and preferably the potassium salt, of a perfluoroalkyl or perfluorocycloalkyl sulfonate as disclosed in U.S. Pat. No. 3,679,587. Such perfluoroalkyl and perfluorocycloalkyl sulfonates preferably encompass alkyl groups of from 1 to 10 carbon atoms and cycloalkyl groups of form 3 to 10 carbon atoms. Several of these perfluoroalkyl sulfonates are available commercially under the tradenames FC-95, FC-98 and the like, from, for example, 3M, Minneapolis, Minn.

The erosion inhibitor is employed in an amount effective to inhibit erosion in the power transmission mechanisms of an aircraft and, preferably, is employed in an amount of from about 0.01 to about 0.15 wt %, based on the total weight of the hydraulic fluid composition and more preferably from about 0.02 to about 0.1 wt %. Mixtures of such anti-erosion agents can be used.

The hydraulic fluid compositions used in the method of this invention can further optionally comprise an antioxidant or mixture of antioxidants in an amount effective to inhibit oxidation of the hydraulic fluid or any of its components.

Representative antioxidants include, by way of example, phenolic antioxidants, such as 2,6-di-tert-buty-p-cresol, tetrakis[methylene(3,5-di-tert-butyl-4-hydroxyhydrocinnamate)]-methane (Irganox® 1010 from Ciba Geigy), bis (3,5 di-tert-butyl-4 hydroxyphenyl) methane (Ethanox 702 from Ethyl corporation), 1,3,5-trimethyl-2,4,6-tris (3,5-di-tert butyl-4-hydroxyphenyl) benzene (Ethanox 330 from Ethyl Corporation) and the like; amine antioxidants including, by way of example, diarylamines, such as octylated diphenyl amine (Vanlube® 81), phenyl-α-naphthylamine, alkylphenyl-α-naphthylamine, or the reaction product of N-phenylbenzylamine with 2,4,4-trimethylpentene (Irgano® L-57 from Ciba Geigy), diphenylamine, ditoylamine, phenyl tolyamine, 4,4'-diaminodiphenylamine, di-p-methoxydiphenylamine, or 4-cyclohexylaminodiphenylamine. Still other suitable antioxidants include aminophenols such as N-butylaminophenol, N-methyl-N-amylaminophenol and N-isooctyl-p-aminophenol as well as mixtures of any such antioxidants.

A preferred mixture of antioxidants comprises 2,6-di-tert-butyl-p-cresol and di(octylphenyl)amine (e.g., a 1:1 mixture). Another preferred mixture of antioxidants is 2,6-di-tert-butyl-p-cresol, di(octylphenyl)amine and 6-methyl-2,4-bis(octylthio)-methyl]-phenol (e.g., 1:2:4 mixture). Still another preferred mixture of antioxidants is 2,6-di-tert-butyl-p-cresol, di(octylphenyl)amine and tetrakis[methylene (3,5-di-tert-butyl-4-hydroxyhydrocinnamate)]methane (e.g., a 1:2:3 mixture).

The antioxidant or mixture of antioxidants is employed in an amount effective to inhibit oxidation of the hydraulic fluid. The antioxidant or mixture of antioxidants is employed in an amount ranging from about 0 to about 3 wt %, more preferably from about 0.5 to 2.5 wt % and still more preferably at from about 1 to 2 wt % based on the total weight of the hydraulic fluid composition.

In a further embodiment, the hydraulic fluid compositions used in the method of this invention further optionally comprise a rust inhibitor or a mixture of rust inhibitors in an amount effective to reduce the formation of rust or corrosion on metal surfaces exposed to the hydraulic fluid. Suitable rust inhibitors are described in U.S. Pat. Nos. 5,035,084, 4,206,067 and 5,464,551, the entire disclosure of which is incorporated herein by reference in its entirety. Representative rust inhibitors include, by way of example, calcium dinonylnaphthalene sulfonate, a Group I or Group II metal overbased and/or sulfurized phenate, sulfonate or carboxylate, a compound of the formula:

$$R^4N[CH_2CH(R^5)OH]_2$$

wherein $R^4$ is selected from the group consisting of alkyl of from 1 to 40 carbon atoms, $-COOR^6$ and $-CH_2CH_2N[CH_2CH(R5)OH]_2$, where $R^6$ is alkyl of from 1 to 40 carbon atoms, and each $R^5$ is independently selected from the group consisting of hydrogen and methyl, including N,N,N',N'-tetrakis(2-hydroxypropyl)ethylene diamine and N,N-bis(2-hydroxyethyl)tallowamine (e.g., N tallow amine alkyl-2,2'-iminobisethanol, sold under the trade name Ethomeen T/12).

The Group I and Group II metal overbased and/or sulfurized phenates, preferably are either sulfurized Group I or Group II metal phenates (without $CO_2$ added) having a Total Base Number (TBN) of from greater than 0 to about 200 or a Group I or Group II metal overbased sulfurized phenate having a TBN of from 75 to 400 prepared by the addition of carbon dioxide during the preparation of the phenate. More preferably, the metal phenate is a potassium or calcium phenate. The phenate advantageously modifies the pH to provide enhanced hydrolytic stability.

Each of these components are either commercially available or can be prepared by art recognized methods. For example, Group II metal overbased sulfurized phenates are commercially available from Chevron Chemical Company, San Ramon, Calif. under the trade name OLOA® including, OLOA 219®, OLOA 216Q® and the like and are described by Campbell, U.S. Pat. No. 5,318,710, and by MacKinnon, U.S. Pat. No. 4,206,067. Likewise, N,N,N',N'-tetrakis(2-hydroxy-propyl)ethylenediamine is disclosed by MacKinnon, U.S. Pat. No. 4,324,674. The disclosures of each of these patents are incorporated herein by reference in their entirety.

Group I or II metal dinonylnaphthalene sulfonates, such as calcium dinonylnaphthalene sulfonate (Na-Sul 729 commercially available from King industries) may also be used as a rust inhibitor in the hydraulic fluid composition in an amount ranging from 0.2 to 1.0 wt % of the hydraulic fluid composition.

The rust inhibitor or mixture of rust inhibitors is employed in an amount effective to inhibit the formation of rust. The rust inhibitor is employed in an amount ranging from about 0 to about 1 wt %, preferably 0.001 to about 1 wt %, more preferably about 0.005 to about 0.5 wt %, and still more preferably at about 0.01 to 0.1 wt % based on the total weight of the hydraulic fluid composition. In a preferred embodiment, the rust inhibitor comprises a mixture of N,N,N',N'-tetrakis(2-hydroxypropyl)ethylenediamine and a Group II metal overbased phenate (e.g., a 5:1 mixture). In another preferred embodiment, the rust inhibitor comprises a mixture of N,N-bis(2-hydroxyethyl)tallowamine (Ethomeen®T/12) and a Group II metal overbased phenate (e.g., a 5:1 mixture).

The hydraulic fluid compositions useful in the method of this invention can optionally contain further additives such as copper corrosion inhibitors (e.g., thiadiazoles, triazoles, triazole derivatives such as benzo or alkyl benzo triazole), anti-foaming agents, dyes, etc. Such additives are well-known in the art and are commercially available.

EXAMPLE

The successful lubrication of a hydraulic system was demonstrated using a test rig modified to operate at 5000 psi. Modifications included use of a pump capable of generating 5000 psi pressure, modification of housings and fittings to withstand 5000 psi pressure, placement in the test circuit of servo control units, valves, accumulators, fitters, fittings, and seals, etc., all sized, reinforced or made using materials capable of withstanding at least 5000 psi operating pressure.

In the test, the pump supplies hydraulic power to a circuit containing servo controls, a braking system and a motor unit. An electronic box controls each item of equipment, with a given number of operating cycles. The temperature of the hydraulic fluid is controlled by a by-passable exchanger which must not produce copper ions. The pressure and temperature are continuously monitored any deviation from pre-set values leads to unit shutdown. The hydraulic reservoir is air pressurized to a relative pressure of 3.5 bars (50.8 psig), with direct contact between air and the hydraulic fluid. Test rig fluid capacity is about 70 liters, including 26 liters in the reservoir. Overall internal leakage of the test rig is measured with a flowmeter. Individual internal leakage at each piece of equipment in the overall rig is accurately measured (1% maximum error). Fluid cleanliness is maintained at ≧8 according to NAS 1638.

The Aerospatiale "Endurance Systems Test for Hydraulic fluids regarding valves ERosion" (ESTHER) test procedure is outlined below:

a) Preparing the test rig before the test

Fully drain the rig. Rinse the circuit with the new fluid; fill the rig and operate for 5 minutes. Fully drain the rinsing fluid.

Fill the rig with the fluid to be tested, the water and chlorine content of which shall have been increased to the following values:

Water: (0.5±0.05) %
Chlorine: (200±20) ppm
Replace the rig filters.
Take a sample of fluid and analyze its physical and chemical properties.
Results must be indicated in the technical data sheet, except for chlorine content which shall be increased to (200±20) ppm. Testing must not start until these results have been confirmed.
b) Test rig operation
Start the rig and operate until the fluid temperature stabilizes at +95° C., temperature which shall be maintained throughout the test duration, this stabilization shall be reached within less than 2 hours operation.
Perform the operating cycles; frequency shall be 2 cycles per hour of bench operation. The operating cycles are shown in Table 1.

TABLE 1

Aileron EHSV Test Bench Duty Cycle

| Operating Case Surface Rate | Surface Deflection | | Number of Functioning Per Cycle |
|---|---|---|---|
| Pressurization 0/340 bars/0 | 30°/0/30° | | 2 |
| Check list maneuver 40°/second | 0/−25°/24°/0 | | 2 |
| Take-off and climb Descent and approach 15°/second | 0° | ±1° | 3 |
| | | ±2° | 1.5 |
| | | ±4° | 0.5 |
| | | ±6° | 0.1 |
| | | ±10° | 0.04 |
| | | | 0.02 |
| | 10° | ±1° | 64 |
| | | ±2° | 36 |
| | | ±4° | 13 |
| | | ±6° | 2.4 |
| | | ±10° | 0.9 |
| | | | 0.4 |
| | 15° | ±1° | 54 |
| | | ±2° | 30 |
| | | ±4° | 11 |
| | | ±6° | 2 |
| | | ±10° | 0.8 |
| | | | 0.4 |
| | 20° | ±1° | 21 |
| | | ±2° | 12 |
| | | ±4° | 4 |
| | | ±6° | 0.8 |
| | | ±10° | 0.3 |
| | | | 0.15 |
| Cruise 5°/second | 0° | ±0.5° | 820 |
| | | ±1.5° | 260 |
| | | ±3° | 45 |
| | | ±4° | 15 |
| | | ±6° | 10 |
| Ground Spoiler 40°/second | 20°/−23°/0° | | 1.2 |

The total duration of bench operation for the test shall be 1,000 hours.

Monitoring test parameters:
Every ten hours, record the:
hydraulic reservoir pressure,
pump delivery pressure,
fluid temperature,
overall internal leakage of the circuit.
At (0; 200; 400; 600; 800; 1,000) hours of test:
record the internal leakage of each item of equipment. The rig fluid temperature shall be lowered to (+±5)° C. in order to carry out these measurements.
take a sample of circuit fluid, via a bleed valve, to analyze its physical and chemical characteristics, and to determine the specific pollution class (NAS1638) (see Table A).
Note: this test should be performed one time with an already qualified fluid (as reference) and repeated with the fluid to be qualified.

TABLE A

Aerospatial ESTHER 5000 psi Test Run Oil Sample Analyses

| Test Hours | 0 | 242 | 242 | 460 | 460 | 622 | 845 | 1033 |
|---|---|---|---|---|---|---|---|---|
| Appearance | clear | clear | clear | clear | clear | clear | clear | clear |
| Color | purple | purple | purple | purple | purple | purple | purple | brown |
| Kinematic Viscosity (cSt) | | | | | | | | |
| at 100° F. | 8.9 | 7.78 | 7.77 | 7.34 | 7.34 | 7.25 | 7.18 | 7.16 |
| at 210° F. | 2.97 | 2.59 | 2.58 | 2.41 | 2.42 | 2.38 | 2.35 | 2.34 |
| Water Content, Karl Fisher (%) | 0.42 | 0.41 | 0.41 | 0.41 | 0.41 | 0.42 | 0.41 | 0.40 |
| Chlorine Content (ppm) | 160 | 139 | 120 | 108 | 115 | 113/103 | 79 | 27 |
| Total Acid Number (mg KOH/g) | 0.04 | 0.05 | 0.04 | 0.05 | 0.05 | 0.05 | 0.07 | 0.05 |
| Potassium Content (ppm) | 47 | 41.3 | 41.5 | 40.5 | 40.5 | 40.8 | 40.5 | 41 |
| Particle Count (per 100 ml) | | | | | | | | |
| 5–15 micron | 1980 | 20030 | 1683 | 2573 | 2640 | 2870 | 7073 | 4693 |
| 15–25 micron | 245 | 727 | 213 | 495 | 390 | 230 | 435 | 640 |
| 25–50 micron | 95 | 140 | 80 | 160 | 115 | 73 | 113 | 310 |
| 50–100 micron | 10 | 7 | 20 | 5 | 13 | 5 | 13 | 58 |
| >100 micron | 5 | 0 | 0 | 5 | 3 | 0 | 0 | 5 |
| NAS 1638 Class | 5 | 7 | 4 | 5 | 4 | 4 | 5 | 6 |

TABLE A-continued

Aerospatial ESTHER 5000 psi Test Run Oil Sample Analyses

| Test Hours | 0 | 242 | 242 | 460 | 460 | 622 | 845 | 1033 |
|---|---|---|---|---|---|---|---|---|
| Elements (ppm) | | | | | | | | |
| Calcium | 7.5 | 6.9 | 7.2 | 6.8 | 6.8 | 6.8 | 6.7 | 6.7 |
| Copper | <1 | <1 | <1 | <1 | <1 | 1 | 1.2 | 1.4 |
| Iron | <1 | <1 | <1 | <1 | <1 | 1.2 | 1.6 | 2.0 |
| Sodium | 6.7 | 6.3 | 6.7 | 6.4 | 6.4 | 5.6 | 6.8 | 6.6 |
| Sulfur | 90 | 90 | 90 | 110 | 110 | 110 | 120 | 110 |
| Silicon | <1 | <1 | <1 | <1 | <1 | 3.1 | <1 | 4 |

TABLE B

Aerospatiale ESTHER 3000 psi Test Run Oil Sample Analyses

| Test Hours | 0 | 240 | 400 | 600 | 800 | 1000 |
|---|---|---|---|---|---|---|
| Appearance | clear | clear | clear | clear | clear | clear |
| Color | purple | purple | purple | purple | purple | purple |
| Kinematic Viscosity (cSt) | | | | | | |
| at 100° F. | 8.848 | 7.528 | 7.450 | 7.256 | 7.206 | 7.185 |
| at 210° F. | 2.960 | 2.486 | 2.459 | 2.372 | 2.345 | 2.330 |
| Water Content (%) | 0.47 | 0.44 | 0.43 | 0.42 | 0.40 | 0.37 |
| Chlorine Content (ppm)* | 200 | 188 | 195 | 211 | 190 | 232 |
| Total Acid Number (mg KOH/g) | 0.04 | 0.02 | 0.03 | 0.03 | 0.07 | 0.04 |
| Potassium Content (ppm) | 44.3 | 40.3 | 39.5 | 39.6 | 41.2 | 39.6 |
| Particle Count (per 100 ml) | | | | | | |
| 5–15 micron | 5600 | 2110 | 2200 | 2345 | 6385 | 630 |
| 16–25 micron | 1140 | 555 | 580 | 415 | 2040 | 170 |
| 26–50 micron | 382 | 170 | 187 | 115 | 360 | 75 |
| 51–100 micron | 90 | 40 | 47 | 22 | 55 | 10 |
| 100+ micron | 22 | 2.5 | 12 | 5 | 7.5 | 0 |
| NAS 1638 Class | 5 | 5 | 6 | 5 | 6 | 4 |
| Elements (ppm) | | | | | | |
| Calcium | 7.2 | 7.7 | 7.6 | 7.4 | 7.7 | 7.4 |
| Copper | <1 | 0.4 | 0.5 | 0.5 | 0.6 | 0.5 |
| Iron | <1 | <1 | 0.4 | 0.4 | 0.6 | 0.7 |
| Sodium | 9.6 | 9.1 | 9.5 | 12 | 12 | 10 |
| Sulfur | 92 | 97 | 98 | 95 | 92 | 90 |
| Silicon | 1.1 | 1.2 | 0.9 | <1 | 1.6 | 2.6 |

*Lab 1 data only reported in this Table.

c) Examination after testing

At the end of the test, after 1,000 hours operation, a laboratory examination of the following equipment will be carried out:

filters: pressure loss measurement, then disassembly of the filter elements to check for gel or abnormal deposits.

servocontrols: disassembly of the servovalves on equipment items for defect investigation of internal parts.

hydraulic motor and pump: disassembly to check the condition of internal parts.

In the standard 3000 psi test, three aileron electrohydraulic servo valves (EHSV), one hydraulic motor, a brake servo valve and a hydraulic pump are tested. The 5000 psi test evaluated only one EHSV and two different model pumps, the first pump operated from zero to approximately 250 hours and the second pump from 250 to 1000 hours.

d) Analysis of results

TABLE C

Analysis of the test fluid sampled during and after the test

| PROPERTY | LIMITS FOR ALL TYPES |
|---|---|
| Acidity Index (mg KOH/g of fluid) | 0.5 maximum |
| Viscosity (mm$^2$.s$^{-1}$) | |
| at + 38° C. | 6.0 minimum |
| Conductivity ($\mu$S.cm$^{-1}$) | 0.3 minimum |
| Color - Condition | Purple - Clear Appearance |

Equipment defect investigation: parts sensitive to erosion, such as spools and sleeves, fluid orifices and jet deviation systems shall be inspected in particular. Any trace of electrochemical erosion, abnormal deposit or wear shall be noted.

The condition of parts inspected after testing with new fluid shall be comparable to that obtained with the qualified fluid.

TABLE D

Erosivity criteria

| SERVOVALVE DISTRIBUTOR PARTS | | ERODED LENGTH (μm) | ERODED DEPTH (μm) |
|---|---|---|---|
| Spool | | ≤40 | ≤5 |
| Sleeve | | ≤25 | ≤5 |
| Jet Deviation System | Hydraulic Amplifier Needle | ≤30 No erosion in jet deviation slot | ≤6 |

This test rig was employed to evaluate a phosphate ester hydraulic fluid at 5000 psi. The fluid comprised about 35 wt % tri isobutyl phosphate, about 30 wt % tri butyl phosphate, about 12.5 wt % of poly alkyl (meth) acrylate viscosity index improver (40% active ingredient in tri butyl phosphate diluent oil), about 6 wt % mono epoxide acid scavenger, 0.06 wt % perfluoroalkyl sulfonate erosion inhibitor, about 1.5% mixture of phenolic and aminic antioxidant, about 0.1% rust inhibitor, and trace amounts of dye and antifoamant.

It was found that the fluid performed satisfactorily, there being no significant difference between performance at 5000 psi versus at 3000 psi attributable to the oil used. Oil inspection results are reported for the 5000 psi test in Table A. Comparative results for the 3000 psi test using the same hydraulic fluid sample is reported in Table B.

The oil was analyzed by monitoring its properties as a function of time during a 3000 psi test run and a 5000 psi test run. Viscosity, Dohrmann analysis or (by ASTM D 445) water content (by Karl-Fischer titration chlorine content (by x-ray fluorescence), total acid number (by ASTM D974) potassium content (by Atomic Absorption), particle count and the following elements: Ca, Cu, Fe, Na, S, Si (by Inductively Coupled Plasma Atomic Emissions) were measured. The results are reported in FIGS. 1, 2, 3 and 4 for viscosity, chlorine content, and Total Acid Number.

FIG. 1 compares the fluid viscosity at 100° F. over about 1000 hours during 3000 psi and 5000 psi test runs. It is apparent that the fluid exhibits no significant difference in viscosity behavior. Viscosity decrease exhibited in both tests attributed to shearing of the VI improver. The fluid viscosity remained above 6.0 cSt (minimum requirement by Airbus/Aerospatiale specification NSA 307110).

FIG. 2 compares the fluid viscosity at 210° F. over 1000 hours during 3000 psi and 5000 psi test runs. Again there was no significant difference between the viscosity change at 3000 psi and 5000 psi.

FIG. 3 compares the fluid chlorine content over about 1000 hour during 3000 psi and 5000 psi. Freon TF was used as the chlorine contaminant (boiling point 48° C.). Chlorine content is seen to decrease significantly over time during the 5000 psi test run, attributed to evaporation. There was no significant chlorine loss observed over the 3000 psi test.

FIG. 4 compares the total acid number of the fluids over about 1000 hours of test, employing one sample at 5000 psi and 2 samples at 3000 psi. It is seen that the fluid behaved satisfactorily at 5000 psi over the test period.

In general it was found that fluid performance was similar at 3000 psi and at 5000 psi. Pressure did not degrade the fluid properties. Comparable results were secured for the other properties listed; water content, TAN, potassium content, particle count, ICP metals.

During the test run, the internal leakage rates through the tested parts (case drain flow for the two pumps and leakage flow through the electro-hydraulic servo-valve (EHSV)) were monitored. There was no increase in internal leakage rates. Microscopic examination of the EHSV spool showed small spots (10 μm long×5 μm wide), possibly indication of erosion, however, well within the pass criteria of this test. The sleeve, though showing evidence of some wear and scratches, did not show any erosion spots. The deviation jet amplifier showed spots ranging from 1 μm to 7 μm in dimension well within the pass criteria of this test. It is noted, however, that the reduction in the fluid chlorine concentration during 5000 psi test run may have had an effect on the extent of erosion.

What is claimed is:

1. A method for operating and lubricating hydraulic systems at pressure of about 4000 psi by employing as a hydraulic fluid a phosphate ester functional fluid comprising a major amount of fire resistant phosphate ester base stock and a minor effective amount of additives comprising one or more perfluoroalkyl sulfonic acid or perfluorocycloalkyl sulfonic acid, and salts of the same, anti erosion agent(s), one or more monoepoxide acid scavenger(s) and one or more viscosity index improver(s).

2. The method of claim 1 wherein the hydraulic system is operating at a pressure of about 5000 psi or higher.

3. The method of claim 1 or 2 wherein the phosphate ester hydraulic fluid base oil comprises a mixture of tri alkyl phosphate, di alkyl alyl phosphate, alkyl diaryl phosphate, and triaryl phosphate.

4. The method of claim 3 wherein the dialkyl aryl phosphate and alkyl diayl phosphate are selected from dibutyl phenyl phosphate, butyl diphenyl phosphate, diisobutyl phenyl phosphate, isobutyl diphenyl phosphate.

5. The method of claim 1 or 2 wherein the phosphate ester hydraulic fluid base oil comprises tri alkyl phosphate and tri alkyl phosphate.

6. The method of claim 5 wherein the tri alkyl phosphate is a mixture of tri iso butyl phosphate and tri-n-butyl phosphate.

7. The method of claim 6 wherein the tri iso butyl phosphate constitutes about 30 to 80 wt % of the base stock, the tri n-butyl phosphate constitutes about 20 to 60 wt % of the base stock and the tri aryl phosphate constitutes about 3 to 15 wt % of the base stock.

8. The method of claim 5 wherein the trialkyl phosphate is tri isobutyl phosphate.

9. The method of claim 5 wherein the trialkyl phosphate is tri n-butyl phosphate.

10. The method of claim 5 wherein the triarylphosphate is tri (isopropyl phenyl) phosphate, tri (tert-butyl phenyl) phosphate, or a mixture of the two.

11. The method of claim 1 or 2 wherein the fluid further contains one or more of an effective amount of a rust inhibitor or mixture of rust inhibitors and an effective amount of an antioxidant or a mixture of antioxidants.

12. The method of claim 8 wherein the fluid comprises a major amount of a fire resistant phosphate ester base stock and a mixture of additives comprising from 2 to 10 wt % active ingredient, based on the total fluid, of a viscosity index improver, from 4 to 10 wt %, based on the total fluid, of an acid control additive, from 0.01 to 0.15 wt %, based on the total fluid, of an erosion inhibitor, from 0 to 1.0 wt %, based on the total fluid, of one or more rust inhibitors, from 0 to 3 wt %, based on the total fluid, of one or more antioxidants.

13. The method of claim 3 wherein the trialkyl phosphate is tri n-butyl phosphate.

14. The method of claim 3 wherein the trialkyl phosphate is triisobutyl phosphate.

15. The method according to claim 11 wherein the antioxidants can be aminic or phenolic or a mixture of the two.

16. The method of claim 12 wherein the acid control additive is of the formula

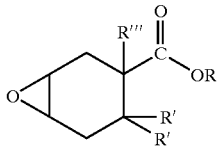

wherein R is selected from the group consisting of an alkyl group of from 1 to 10 carbon atoms optionally containing from 1 to 4 ether oxygen atoms therein and cycloalkyl of from 3 to 10 carbon atoms, each R' is independently selected from the group consisting of hydrogen, alkyl of 1 to 10 carbon atoms and —C(O)OR" where R" is alkyl of from 1 to 10 carbon atoms and 0 to 4 ether oxygen atoms therein or cycloalkyl of from 3 to 10 carbon atoms, and R'" is selected from the group consisting of hydrogen, alkyl of from 1 to 10 carbon atoms and —C(O)OR" where R" is alkyl of from 1 to 10 carbon atoms optionally containing from 1 to 4 ether oxygen atoms therein or cycloalkyl of from 3 to 10 carbon atoms.

17. The method of claim 12 wherein the erosion inhibitor is a perfluoroalkyl or perfluorocycloalkyl sulfonic acid, or a metal salt of the same, or mixture of these sulfonic acid acids and metal salts, where the alkyl groups encompass 1 to 10 carbon atoms and the cycloalkyl groups from 3 to 10 carbon atoms.

18. The method according to claim 12 wherein the viscosity index improver is a poly(alkyl acrylate) or poly(alkyl methacrylate) esters having a weight average molecular weight in the range from 45,000 to 100,000.

19. The method of claim 3 wherein the trialkyl phosphate is a mixture of tri n-butyl phosphate and triisobutyl phosphate.

20. A method for operating and lubricating hydraulic systems at pressure of about 5000 psi and higher by employing as a hydraulic fluid a phosphate ester functional fluid comprising:

a major amount of fire resistant phosphate ester base stock;

from 2 to 10 wt % active ingredient, based on the total fluid, of at least on poly(alkyl acrylate) or poly(alkyl methacrylate) ester having a weight average molecular weight in the range from 45,000 to 100,000;

from 4 to 10 wt %, based on the total fluid, of an acid control additive acid control additive of the formula

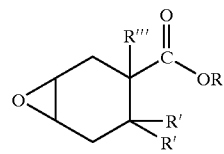

wherein R is selected from the group consisting of an alkyl group of from 1 to 10 carbon atoms optionally containing from 1 to 4 ether oxygen atoms therein and cycloalkyl of from 3 to 10 carbon atoms, each R' is independently selected from the group consisting of hydrogen, alkyl of 1 to 10 carbon atoms and —C(O)OR" where R" is alkyl of from 1 to 10 carbon atoms and 0 to 4 ether oxygen atoms therein or cycloalkyl of from 3 to 10 carbon atoms, and R'" is selected from the group consisting of hydrogen, alkyl of from 1 to 10 carbon atoms and —C(O)OR" where R" is alkyl of from 1 to 10 carbon atoms optionally containing from 1 to 4 ether oxygen atoms therein or cycloalkyl of from 3 to 10 carbon atoms;

from 0.01 to 0.15 wt %, based on the total fluid, of a perfluoroalkyl or perfluorocycloalkyl sulfonic acid, or a metal salt of the same, or mixture of these sulfonic acid acids and metal salts, where the alkyl groups encompass 1 to 10 carbon atoms and the cycloalkyl groups from 3 to 10 carbon atoms;

from 0 to 1.0 wt %, based on the total fluid, of one or more rust inhibitors; and from 0 to 3 wt %, based on the total fluid, at least one of aminic or phenolic antioxidants.

* * * * *

UNITED STATES PATENT AND TRADEMARK OFFICE
CERTIFICATE OF CORRECTION

PATENT NO. : 6,703,355 B2
DATED : March 9, 2004
INVENTOR(S) : Shlomo Antika et al.

It is certified that error appears in the above-identified patent and that said Letters Patent is hereby corrected as shown below:

Title page,
Item [73], Assignee, after "ExxonMobil Research and Engineering Company, Annandale, NJ (US)" insert: -- and EADS Airbus SA, Toulouse, France --

Signed and Sealed this

Thirteenth Day of July, 2004

JON W. DUDAS
*Acting Director of the United States Patent and Trademark Office*

(12) EX PARTE REEXAMINATION CERTIFICATE (7189th)
United States Patent
Antika et al.

(10) Number: US 6,703,355 C1
(45) Certificate Issued: Nov. 24, 2009

(54) METHOD FOR LUBRICATING HIGH PRESSURE HYDRAULIC SYSTEM USING PHOSPHATE ESTER HYDRAULIC FLUID

(75) Inventors: Shlomo Antika, Maplewood, NJ (US); Marc-Andre Poirier, Cherry Hill, NJ (US); Jean-Michel Pascual, Venerque (FR); Gerard Dallemagne, Villepreux (FR)

(73) Assignee: ExxonMobil Research & Engineering Co., Annandale, NJ (US)

Reexamination Request:
No. 90/007,158, Aug. 5, 2004
No. 90/007,712, Sep. 10, 2005

Reexamination Certificate for:
Patent No.: 6,703,355
Issued: Mar. 9, 2004
Appl. No.: 09/922,088
Filed: Aug. 3, 2001

Certificate of Correction issued Jul. 13, 2004.

Related U.S. Application Data
(60) Provisional application No. 60/223,221, filed on Aug. 4, 2000.

(51) Int. Cl.
*C10M 169/00* (2006.01)
*C10M 169/004* (2006.01)
*F16N 15/00* (2006.01)

(52) U.S. Cl. .................................. 508/433; 252/75.5
(58) Field of Classification Search .................. None
See application file for complete search history.

(56) References Cited

U.S. PATENT DOCUMENTS 2,707,176 A * 4/1955 Gamrath et al. ............ 252/78.5
5,464,551 A   11/1995 Deetman

OTHER PUBLICATIONS

Hurst Emergency products, Instruction Manual for the 5.5 HP Honda Gas Power Unit—Published in 1997.
Phosphate Ester Hydraulic Fluid Peformance at Higher Pressure—Terry C. Wolfe.
Material Safety Data Sheet, MCS–2361, Jaws of LIfe (undated), pp. 1–5.
Solutia Inc. Material Safety Data Sheet, Sep. 25, 2001, MCS–2361, pp. 1–8.
Phosphate Ester Hydraulic Fluids Performance at Higher Pressure, Terry C. Wolf, Solutia, Oct. 14, 1998, pp. 1–7.
Boeing Material Specification, BMS 3–11G, pp. 1–22, Jul. 17, 1986.
Boeing Material Specification, BMS 3–11M, pp. 1–30, Mar. 28, 2003.

* cited by examiner

*Primary Examiner*—Jerry D. Johnson

(57) ABSTRACT

The present invention is a method for operating a hydraulic system at pressures of about 4000 psi or higher, preferably about 5000 psi or higher by using as the lubricant a phosphate ester hydraulic oil comprising a fire resistant phosphate esters base stock, a viscosity index improver, an anti erosion agent, an acid scavenger. The fluid used in the present method can also contain rust inhibitors and/or antioxidants.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–20 are cancelled.

* * * * *